US010284263B2

(12) United States Patent
Ahmadi (10) Patent No.: US 10,284,263 B2
(45) Date of Patent: May 7, 2019

(54) METHODS FOR OPERATING WIRELESS ELECTRONIC DEVICES IN COORDINATED MULTIPOINT TRANSMISSION NETWORKS

(71) Applicant: Apple Inc., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 15/049,945

(22) Filed: Feb. 22, 2016

(65) Prior Publication Data

US 2016/0248483 A1 Aug. 25, 2016

Related U.S. Application Data

(63) Continuation of application No. 13/310,122, filed on Dec. 2, 2011, now Pat. No. 9,270,346.

(51) Int. Cl.
*H04B 7/024* (2017.01)
*H04B 7/06* (2006.01)
(Continued)

(52) U.S. Cl.
CPC ............ *H04B 7/024* (2013.01); *H04B 7/0608* (2013.01); *H04B 17/318* (2015.01);
(Continued)

(58) Field of Classification Search
CPC ........ H04B 7/022; H04B 7/024; H04B 7/026; H04B 7/028; H04B 7/0608; H04B 7/0632;
(Continued)

(56) References Cited

U.S. PATENT DOCUMENTS 8,738,001 B2* 5/2014 Fahldieck ............. H04W 36/32
455/438
2008/0057954 A1* 3/2008 Morgan ................. H04B 7/022
455/435.1
(Continued)

OTHER PUBLICATIONS

3GPP TR 36.819, 3rd Generation Partnership Project; Technical Specification Group Radio Access Network; Coordinated Multi-Point Operation for LTE Physical Layer Aspects (Release 11).*
(Continued)

*Primary Examiner* — Andrew Lai
*Assistant Examiner* — Hoyet H Andrews, III
(74) *Attorney, Agent, or Firm* — Meyertons, Hood, Kivlin, Kowert & Goetzel, P.C.

(57) ABSTRACT

A coordinated multipoint (CoMP) transmission radio network is provided. Each cell in the CoMP network may include antenna nodes distributed at different geographical locations and coupled to a common baseband processing unit. When operating a user device in the CoMP network, the device may register with a neighboring baseband unit and may be served using at least one antenna node. The device may receive reference signals from different antenna nodes in its vicinity, compute receive signal strength levels, and report the measurements to the corresponding baseband unit. The baseband unit may then switch appropriate antennas in/out of use based on the measured results. If desired, the device may be served using more than one antenna node that may or may not be part of the same cell.

19 Claims, 9 Drawing Sheets

(51) Int. Cl.
  *H04B 7/08* (2006.01)
  *H04B 17/318* (2015.01)
  *H04W 24/10* (2009.01)
  *H04W 60/00* (2009.01)
  *H04W 76/10* (2018.01)

(52) U.S. Cl.
  CPC ........... *H04W 24/10* (2013.01); *H04W 60/00* (2013.01); *H04W 76/10* (2018.02); *H04B 7/0632* (2013.01); *H04B 7/0814* (2013.01)

(58) Field of Classification Search
  CPC .............. H04B 7/0814; H04B 7/15592; H04B 7/0639; H04B 7/0623; H04L 5/0091; H04L 5/0035; H04L 5/0048; H04L 5/0073; H04L 5/0026
  See application file for complete search history.

(56) References Cited

U.S. PATENT DOCUMENTS

| | | | | |
|---|---|---|---|---|
| 2009/0129357 A1* | 5/2009 | Isaac | ..................... | H04W 52/12 370/342 |
| 2010/0075683 A1* | 3/2010 | Johansson | .......... | H04B 7/15507 455/446 |
| 2010/0267408 A1* | 10/2010 | Lee | ..................... | H04W 52/243 455/509 |
| 2010/0273514 A1* | 10/2010 | Koo | ....................... | H04B 7/024 455/501 |
| 2010/0311349 A1* | 12/2010 | Koo | ..................... | H04W 16/02 455/67.11 |
| 2011/0124345 A1* | 5/2011 | Lee | ................... | H04W 72/1231 455/452.2 |
| 2011/0164542 A1* | 7/2011 | Cai | ....................... | H04B 7/155 370/312 |
| 2011/0199975 A1* | 8/2011 | Wu | ....................... | H04L 1/1812 370/328 |
| 2011/0199986 A1* | 8/2011 | Fong | ..................... | H04L 5/0035 370/329 |
| 2011/0281585 A1* | 11/2011 | Kwon | .................. | H04L 1/0002 455/436 |
| 2011/0294527 A1* | 12/2011 | Brueck | ................. | H04W 24/02 455/466 |
| 2011/0319109 A1* | 12/2011 | Kang | ..................... | H04L 5/001 455/507 |
| 2012/0002643 A1* | 1/2012 | Chung | ................. | H04J 11/0093 370/331 |
| 2012/0038521 A1* | 2/2012 | Zhu | ...................... | H04B 17/318 343/703 |
| 2012/0252462 A1* | 10/2012 | Fahldieck | ............. | H04W 36/32 455/438 |
| 2013/0053050 A1* | 2/2013 | Kang | .................... | H04B 7/022 455/452.1 |

OTHER PUBLICATIONS

R1-113644, 3GPP TSG RAN WG1 meeting #67 in San Francisco, USA, Nov. 14-18, 2011 as Agenda Item: 7.5.2.3, and presented by Source: Huawei, HiSilicon, Titled: "RRM measurements on CSI-RS".*

R1-112155, 3GPP TSG RAN WG1 Meeting #66 in Athens, Greece, Aug. 22-26, 2011 as Agenda item: 6.5.1, and presented by Source: Texas Instruments, Titled: "CoMP JT evaluation for Phase II Heterogeneous Deployment".*

R1-114227, 3GPP TSG RAN WG1 #67 in San Francisco, United States, Nov. 14-18, 2011 as Agenda Item: 7.5.2.1.2., and presented by Source: Samsung, Titled: "Discussions on RSRP measurements based on CSI-RS".*

R1-113092, 3GPP TSG-RAN WG1#66bis meeting in Zhuhai, China, Oct. 10-14, 2011, as Agenda Item: 7.5.3.1, and presented by Source: Samsung, Titled: "Discussions on TP associations for CoMP".*

3GPP TR 36.819, as cited above in 3rd Generation Partnership Project; Technical Specification Group Radio Access Network; Coordinated Multi-Point Operation for LTE Physical Layer Aspects (Release 11), (hereinafter referred to as TR 36.819).*

* cited by examiner

FIG. 1

(PRIOR ART)

METHODS FOR OPERATING WIRELESS ELECTRONIC DEVICES IN COORDINATED MULTIPOINT TRANSMISSION NETWORKS

This application claims priority to U.S. patent application Ser. No. 13/310,122 filed Dec. 2, 2011, which is hereby incorporated by reference herein in its entirety. This application claims the benefit of and claims priority to patent application Ser. No. 13/310,122 filed Dec. 2, 2011.

BACKGROUND

This invention relates to wireless electronic devices and more particularly, to ways of operating wireless electronic devices in a radio-frequency communications network.

Electronic devices such as handheld electronic devices, portable electronic devices, and computers are often provided with wireless communications capabilities. Electronic devices with wireless communications capabilities typically include antennas that serve to transmit and receive radio-frequency signals.

It may be desirable to incorporate more than one antenna in a single electronic device. Electronic devices with more than one antenna may be referred to as multi-antenna devices. A multi-antenna device may exhibit performance improvements over a single-antenna device. For example, in comparison to a single-antenna device, a multi-antenna device may have a higher antenna gain and increased capacity. As a result, multi-antenna devices have been developed for use in a wireless communications system. A communications system in which radio-frequency signals are conveyed between two multi-antenna devices may be referred to as a multiple-input and multiple-output (MIMO) system or a multiple antenna system (MAS).

A conventional MIMO communications network typically includes base transceiver stations (or base stations) that are positioned at different geographical locations. A group of antennas and associated radio-frequency equipment are placed adjacent to each base station. The group of antennas located at each base station serves to provide a radio coverage area for that base station. The radio coverage area served by each base station is commonly referred to as a cell. The base stations in the conventional communications network are therefore sometimes referred to as cell sites.

Placing antennas at a centralized location within each cell may be convenient but often does not provide satisfactory coverage particularly at the cell edges. As an example, consider a scenario in which a user device is moving further away from a current serving base station. As the distance between the mobile user device and the group of antennas located at the current serving base station increases, maintaining an active data connection with that base station may become increasingly difficult for the user device (i.e., transmit/receive performance degrades at cell boundaries).

Consider another scenario in which a user device is currently moving within an urban setting having physical variations in the terrain between the user device and the base station. For example, there may be buildings, moving cars, and other obstacles capable of creating coverage holes (i.e., portions in the cell that exhibit substantially degraded service due to the presence of physical obstacles) in the cell. If the user device moves into one of these coverage holes, any data connection between the user device and the serving base station may be terminated.

It may therefore be desirable to provide methods for operating an electronic device in an improved wireless communications network.

SUMMARY

A coordinated multipoint transmission/reception radio communications network may be provided. Each cell in the coordinated multipoint radio network may include multiple antenna nodes (alternatively known as remote radio heads in the literature) that are associated to a common baseband processing unit (or base station) via an optical fiber link. Each antenna node may include at least two antennas and associated radio-frequency front-end circuitry. The antenna nodes may be distributed at various geographical locations within the cell.

In one suitable arrangement of the present invention, a wireless electronic user device (sometimes referred to as a mobile station or user equipment) may be served using only one selected antenna node in a given cell. For example, the user device may be configured to receive reference signals from at least some of the antenna nodes in the given cell and may be capable of performing receive signal strength measurements on the received reference signals. The user device may report the measured results to the base station via the selected antenna node. If signal strength measurements associated with the selected antenna node falls below a predetermined threshold from the perspective of a particular user device, the base station may switch that antenna node out of use in favor of a new antenna node that is currently exhibiting the highest signal strength measurements as measured by the user device. Note that different user devices may be served by a different set/group of antenna nodes.

In another suitable arrangement, the user device may be served by a select subset of antenna nodes that are part of a given cell (e.g., the user device may be served using at least two antenna nodes that are coupled to a common base station). For example, the user device may be configured to receive reference signals from at least some of the antenna nodes in the given cell and may be capable of performing receive signal strength measurements on the received reference signals. The user device may report the measured results to the base station via the current selected subset of antenna nodes. If the signal strength measurements associated with at least one of the antenna nodes in the selected subset of antenna nodes dips below the predetermined threshold, the base station may switch that antenna node out of use in favor of a new antenna node that is currently exhibiting the highest receive signal level.

In another suitable arrangement, the user device may be served simultaneously by selected antenna nodes that could belong to different cells (e.g., the user device may be served in parallel by antenna nodes that are coupled to different base stations). For example, the user device may be configured to receive reference signals from an antenna node in a given cell and from an antenna node in a neighboring cell. The user device may be capable of performing receive signal strength measurements on the received reference signals and reporting the measured results to the base station via the currently selected antenna nodes. If the signal levels associated with at least one of the selected antenna nodes falls below the predetermined threshold, the base station may switch that antenna out of use in favor of a new antenna node. The new antenna node may be part of the given cell or may be part of one of the neighboring cells and may exhibit satisfactory receive signal strength levels.

Further features of the present invention, its nature and various advantages will be more apparent from the accompanying drawings and the following detailed description.

DETAILED DESCRIPTION

Electronic devices may be provided with wireless communications circuitry. The wireless communications circuitry may be used to support wireless communications in multiple wireless communications bands. The wireless communications circuitry may include multiple antennas such as loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
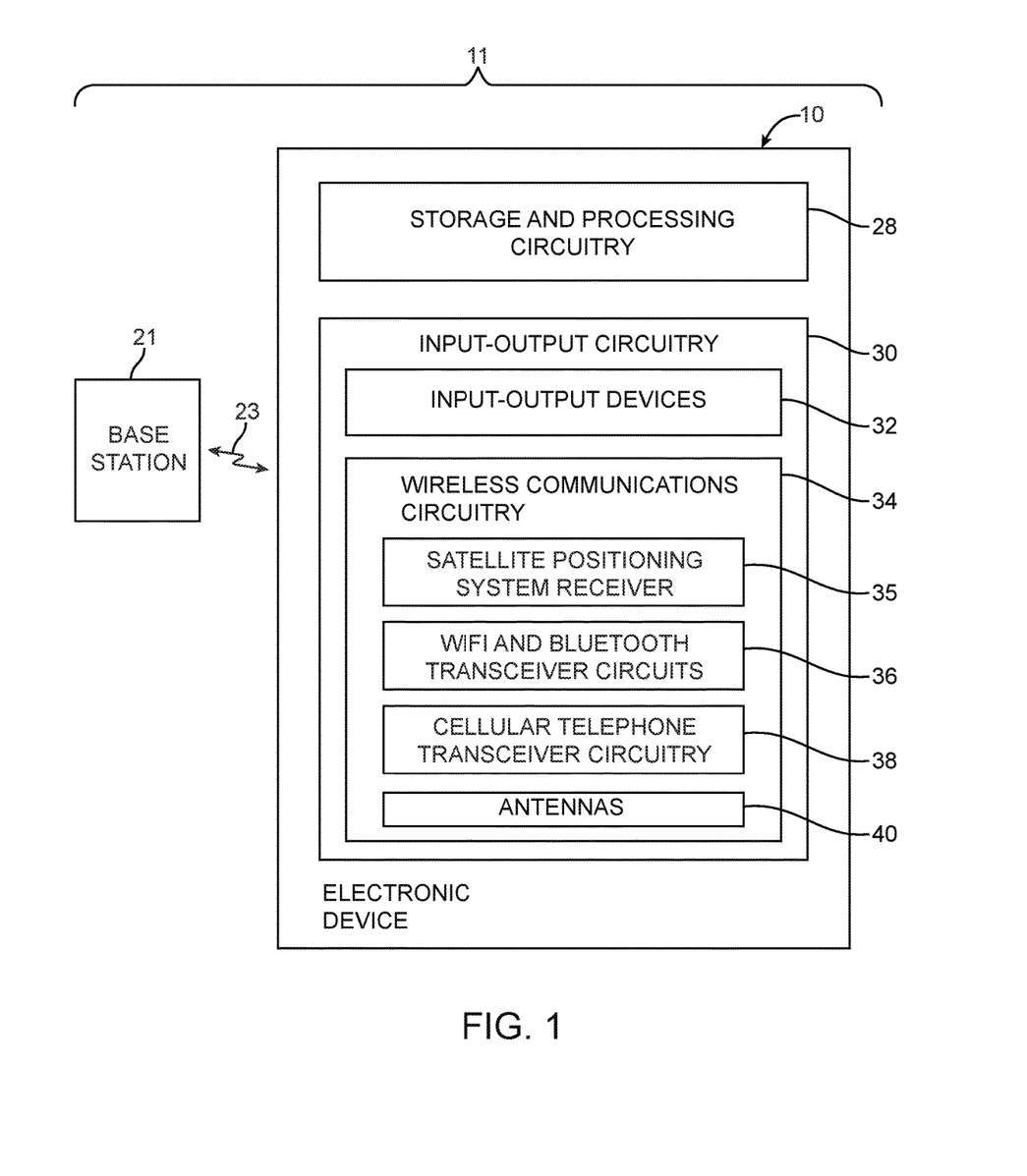
FIG. 1 is a schematic diagram of a wireless network including a base station and an illustrative electronic device with wireless communications circuitry in accordance with an embodiment of the present invention.

A schematic diagram of a system in which electronic device 10 may operate is shown in FIG. 1. As shown in FIG. 1, system 11 may include wireless network equipment such as base station 21 (sometimes referred to as a base transceiver station). Base stations such as base station 21 may be associated with a cellular radio network or other wireless networking equipment. Device 10 may communicate with base station 21 over wireless link 23 (e.g., a cellular telephone link, a data communications link, or other wireless communications link).

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "3G" Universal Mobile Telecommunications System (UMTS) protocol, the "4G" Long Term Evolution (LTE) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received traffic channel signals, etc.). Examples of signal quality measurements that may be made in device 10 include bit error rate measurements, signal-to-noise ratio measurements, measurements on the amount of power associated with incoming wireless signals, channel quality measurements based on reference signal received power (RSRP), received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, accelerometers (motion sensors), ambient light sensors, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise amplifier circuitry, oscillators, mixers, filters, one or more antennas, and other circuitry for handling radio-frequency signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands associated with the LTE radio access technology (as an example) or other cellular telephone bands of interest. Wireless communications circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna.

Figure 2:
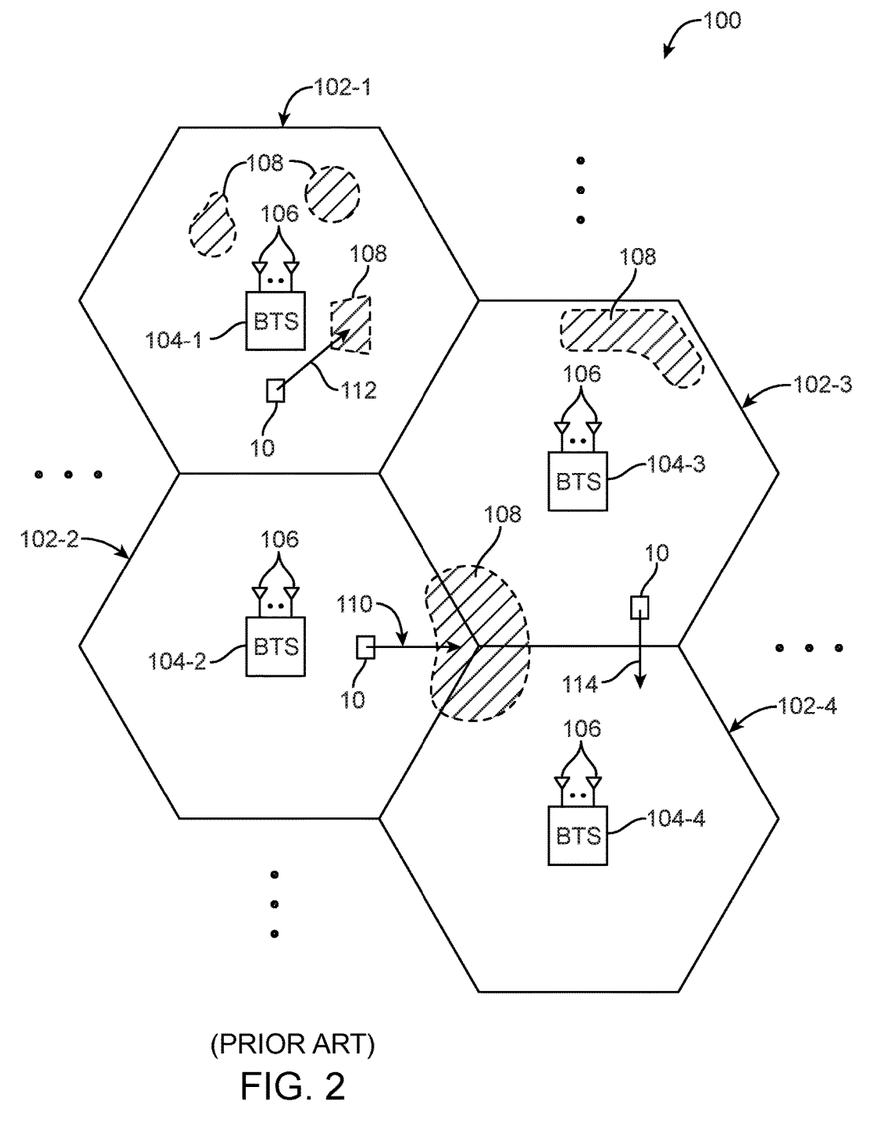
FIG. 2 is a diagram of a conventional cellular network.

FIG. 2 is a diagram of a conventional cellular radio network. A conventional cellular radio network includes multiple base stations (BTSs) each of which is configured to support wireless communications for a respective radio coverage area. The term "cell" is commonly used to refer to the radio coverage area that is provided by a base station. As shown in FIG. 2, conventional cellular radio network 100 includes a first base station 104-1 configured to provide a first cell coverage bounded by line 102-1, a second base station 104-2 configured to provide a second cell coverage bounded by line 102-2, a third base station 104-3 configured to provide a third cell coverage bounded by line 102-3, and a fourth base station 104-4 configured to provide a fourth cell coverage bounded by line 102-4.

Each base station in cellular radio network 100 is connected to an associated group of antennas 106. Each group of antennas 106 is mounted on a cell tower that is physically located at the associated base station. Antennas 106 associated with each base station are used to provide desired wireless communications coverage within the designed cell boundary. Placing antennas 106 at the center of each cell in the conventional approach may be problematic as signal levels can be substantially degraded near cell boundaries. Regions or areas that experience weak or substantially degraded cell coverage are sometimes referred to as "coverage holes." Moreover, it may be difficult for a mobile user device 10 (sometimes referred to as a mobile station or user equipment) to receive signals from antennas 106 if physical obstacles are interposed between antennas 106 and device 10. As a result, cellular network 100 may not only experience coverage holes at cell boundaries but also coverage holes throughout the cell in a setting where physical obstacles such as buildings and moving cars are present.

In the example of FIG. 2, a user device 10 moving away from base station 104-2 towards the cell boundary may enter a coverage hole 108 (see, arrow 110) and experience a loss of connectivity. As another example, a user device 10 roaming in the vicinity of base station 104-1 can also enter a coverage hole 108 (see, arrow 112) if it moves into a region that cannot properly receive signals from base station 104-2 due to the presence of physical obstacles. Movement from one cell to another (see, arrow 114) will require at least layer 2 handover protocols (e.g., a data link layer handoff procedure).

To address some of the limitations of the conventional radio communications network, a distributed antenna system (DAS) may be implemented. A distributed antenna system may include a network of cells each of which includes geographically separated groups of antennas that are coupled to a common baseband processing unit (sometimes referred to herein as a base station). The different groups of antennas may each be referred to as an antenna node. Antenna nodes that are coupled to a common baseband processing unit may each provide radio coverage area referred to as a "sub-cell" and may collectively provide wireless service for a region (cell) that is a union of all the associated sub-cells.

Distributing antennas at respective locations within a cell instead of placing all the antennas at one centralized location enables each of the antennas to transmit at reduced power levels (e.g., a centralized group of antennas radiating at high power levels may be replaced by different groups of antennas radiating at lower power levels while providing the same wireless coverage). In additional to consuming less power for a given amount of radio coverage, the DAS scheme may also provide reduced handoff frequency between successive base stations (because distributing the antenna nodes enables increased cell coverage, thereby allowing the base stations to be spaced further apart from one another), reduced path loss, reduced shadowing losses (since a line-of-sight channel is often present between user device 10 and one of the distributed groups of antennas), reduced fading depths, reduced delay spread, etc.

The DAS scheme may support single-user or multi-user multiple-input multiple-output (MIMO) signaling schemes in which more than one signal stream is being conveyed between at least two multi-antenna devices. Currently, the interface among base stations and their associated antenna nodes have not been standardized. This invention proposes methods for operating user devices 10 in such types of distributed antenna system. In particular, the distributed antenna system may be configured to operate using a coordinated multipoint transmission (CoMP) scheme in which a user device 10 can be served by a selected subset of antenna nodes associated with one or more base stations (e.g., user device 10 may receive downlink radio-frequency signals from or transmit uplink radio-frequency signals to one or more antenna nodes during normal operation).

Device 10 may, for example, be configured to conduct radio-frequency measurements on the downlink wireless signals received from the different antenna nodes and report the results to a current serving base station. The current serving base station may then select a desired subset of optimal antenna nodes to be used in serving device 10 based on the reported results.

Figure 3:
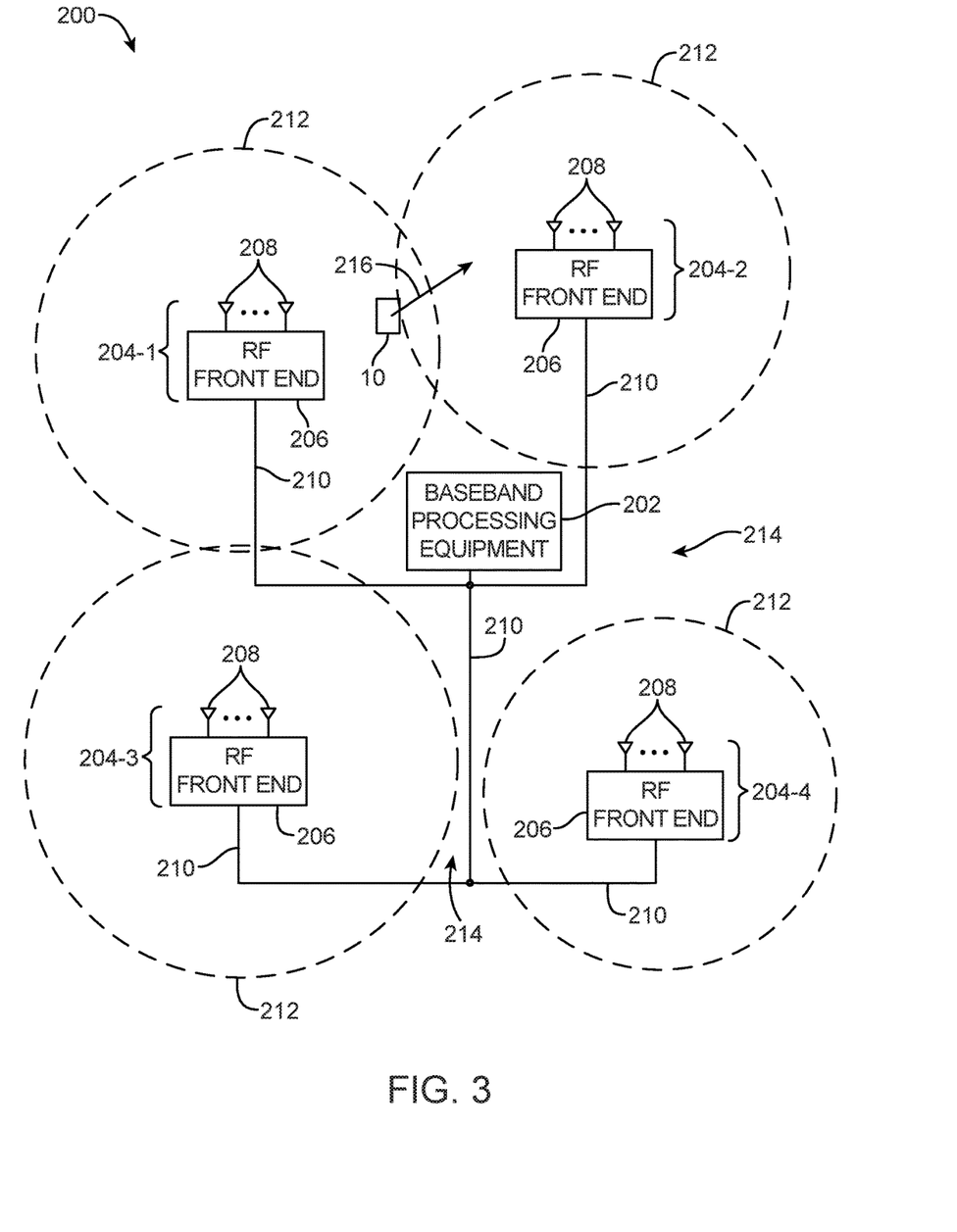
FIG. 3 is a diagram of an illustrative coordinated multipoint (CoMP) transmission radio communications network in which a user device is served by a selected one of the multiple antenna nodes within a cell in accordance with an embodiment of the present invention.

FIG. 3 is a diagram of a cell 200 in a coordinated multipoint transmission/reception wireless network illustrating user device 10 that is being served by only one antenna node at any given point in time. As shown in FIG. 3, cell 200 may include a first antenna node 204-1, a second antenna node 204-2, a third antenna node 204-3, and a fourth antenna node 204-4 each of which is coupled to common baseband processing equipment 202 (sometimes referred to as a baseband processing unit, base transceiver station, base station) via path 210. Baseband processing unit may, for example be a node B or evolved node B capable of implementing the LTE radio access technology (as an example). Paths 210 may be formed using fiber optics, coaxial cabling, or other suitable types of radio-frequency transmission lines.

Each antenna node 204 (e.g., antenna nodes 204-1, 204-2, 204-3, 204-4, etc.) may include at least two antennas 208 and radio-frequency front-end circuitry 206. Front-end circuitry 206 may include power amplifier circuits, low noise amplifier circuits, matching circuits, filters, and other radio-frequency circuitry. To reduce computation complexity and overall power consumption of the radio access network, all baseband processing functions associated with cell 200 may be collocated at baseband processing unit 202.

Antenna nodes 204 may merely be used as transmission/reception gateways for uplink/downlink signals, whereas baseband processing unit 202 may be responsible for all scheduling and network control operations.

Antenna nodes 204 may be distributed at various geographical locations throughout cell 200. The radio coverage range associated with each antenna node may be referred to as a sub-cell (see, e.g., sub-cells 212 in FIG. 3). Regions in cell 200 that are not covered by any of sub-cells 212 (i.e., regions in which user device 10 receives little or no service) may be referred to as coverage holes such as coverage holes 214. If desired, the area of at least some of sub-cells 212 may be enlarged by increasing the transmit power levels of associated antenna nodes 204 so that the percentage of cell 200 that is occupied by coverage holes 214 is reduced.

Cell 200 of FIG. 3 containing only four antenna nodes is merely illustrative and does not serve to limit the scope of the present invention. If desired, a coordinated multipoint transmission/reception radio network may include hundreds or thousands of cells 200. Each cell 200 may include at least two antenna nodes, at least five antenna nodes, at least ten antenna nodes, etc. Each antenna node 204 may include only one antenna 208 (for multiple-input single-output communications, single-input single-output communications, etc.), at least two antennas 208 (for MIMO communications), at least four antennas 208, etc.

Each antenna node 204 that is part of a given cell 200 may be assigned a unique physical layer cell identifier to help baseband processing unit 202 differentiate among the radio-frequency signals that are received from the different antenna nodes. Moreover, each physical antenna 208 in an antenna node 204 may be capable of radiating a unique reference signal. For example, cell 200 having N antenna nodes and L physical antennas 208 within each of the N antenna nodes may be required to support transmission of a total of N×L unique reference signals. These reference signals may be used by device 10 for coherent demodulation and channel estimation when receiving radio-frequency signals from the different antenna nodes. Assuming that user device 10 has K antennas 40 (FIG. 1), a radio-frequency channel between a selected one of antenna nodes 204 and user device 10 may be characterized by an L×K complex-valued channel matrix. In single user MIMO mode, up to L spatial streams can be transmitted in the downlink direction if L is less than K, and up to K spatial streams can be transmitted in the downlink direction if K is less than L. The maximum number of spatial streams in a multiple user MIMO mode may depend on the number of users that are simultaneously being served by baseband processing unit 202 and the number of receive antennas in each user device.

As described above, baseband processing unit 202 is capable of differentiating among the different antenna nodes (e.g., using layer 1 cell identifiers or physical layer identifiers) and is capable of supporting up to a desired number of reference signals depending on the number of antenna nodes present in cell 200 and the number of physical antennas in each antenna node. Information such as cell identifiers associated with each antenna node 204 and the reference signals associated with each physical 208 enables baseband processing unit 202 to intelligently select a desired subset of antenna nodes for use in providing optimum wireless connectivity for user devices 10 roaming in a coordinated multipoint radio network.

As mentioned previously, FIG. 3 is a diagram that illustrates single antenna node intra-cell mobility (e.g., device 10 moving within a given cell 200 may be served using only one antenna node at any point in time). In the example of FIG. 3, user device 10 may initially be served using antenna node 204-1. In a scenario in which device 10 moves in direction 216, device 10 may detect that it is receiving stronger signals from antenna node 204-2 and relatively weaker signals from antenna node 204-1. Device 10 may periodically report such findings to baseband processing unit 202. In response to receiving the reported data from device 10, baseband processing unit 202 may configure antenna node 204-2 to serve device 10 (e.g., base station 202 may switch antenna node 204-2 into use and may switch antenna node 204-1 out of use). Performing antenna node switching between antenna nodes that are part of the same cell 200 does not require any layer 2 or layer 3 handover protocols, because those antenna nodes merely serve as different radio-frequency input-output ports for that particular base station.

Figure 4:
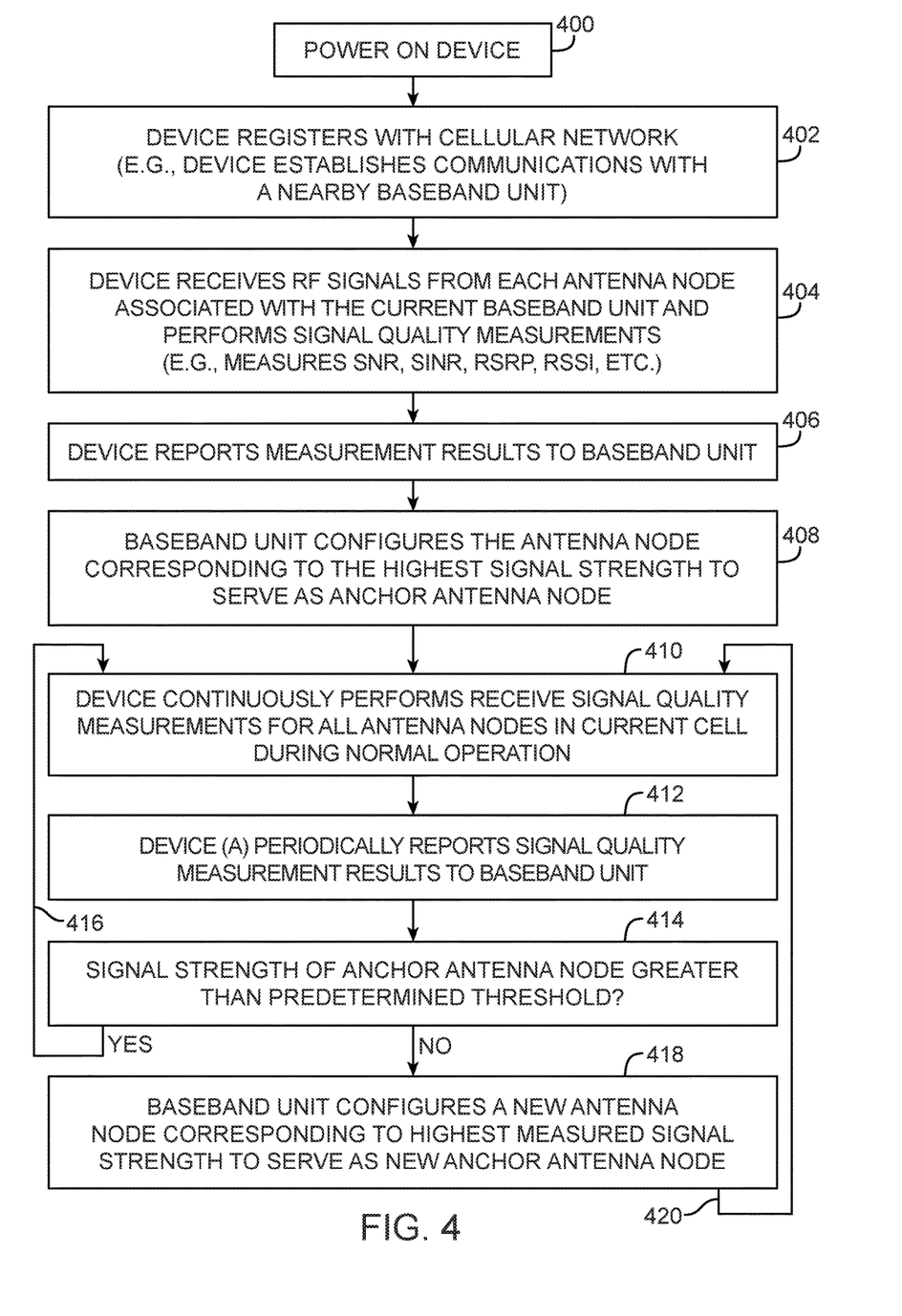
FIG. 4 is a flow chart of illustrative steps involved in operating the user device of FIG. 3 in accordance with an embodiment of the present invention.

FIG. 4 shows illustrative steps involved in operating user device 10 in a single antenna node intra-cell mobility scenario that is described in connection with FIG. 3. At step 400, device 10 may be powered on. At step 402, device 10 may register with the radio network (e.g., device 10 may establish a communications link with a nearby baseband processing unit via a neighboring antenna node). That baseband processing unit becomes the current serving base station.

At step 404, device 10 may receive radio-frequency signals from at least some of antenna nodes associated with the current serving base station and may be configured to perform desired signal quality measurements. For example, storage and processing circuitry 28 in device 10 may be capable of extracting information from downlink reference signals received from antennas 208 to produce reference signal received power (RSRP) measurements, receive strength indicator (RSSI) measurements, received signal code power (RSCP) measurements, signal-to-interference ratio (SINR) information, signal-to-noise ratio (SNR) information, bit error rate measurements, and other measurements indicative of the amount of power associated with incoming wireless signals.

At step 406, device 10 may report the measurement results obtained during step 404 to current serving base station 202. At step 408, base station 202 may configure the antenna node corresponding to the highest measured RSRP measurement to serve as the current "anchor" antenna node (as an example). The anchor antenna may be responsible for receiving uplink radio-frequency signals from device 10. Exemplary steps 402, 404, 406, and 408 describe procedures that are used to help identify an initial anchor antenna node following device startup. Once the initial anchor antenna node has been selected, processing may proceed to step 410.

During normal operation, device 10 may continuously perform receive signal quality measurements for all detectable antenna nodes in the serving cell (step 410). At step 412, device 10 may periodically or aperiodically report the signal quality measurements obtained to base station 202 via the anchor antenna node (e.g., device 10 may receive reference downlink signals from more than one antenna node but may only transmit uplink to the anchor antenna node in the single antenna node network). At step 414, base station 202 may determine whether the signal strength associated with the current anchor antenna node exceeds a predetermined threshold level. If the signal strength of the current anchor antenna node exceeds the predetermined threshold level, processing may loop back to step 410, as indicated by path 416 (e.g., no antenna node switching is necessary if current connectively levels are satisfactory). If the signal strength of the current anchor antenna node falls below the predetermined threshold level (i.e., if baseband processing unit 202 detects that the signal level from the anchor antenna node is unacceptably weak), processing may proceed to step 418.

At step 418, base station 202 may configured a new (target) antenna node having the highest measured signal strength (e.g., the highest RSRP) to serve as the new anchor antenna node. In the example of FIG. 3, base station 202 may configure antenna node 204-2 to serve as the new anchor antenna node when device 10 moves from the first sub-cell associated with antenna node 204-1 to the second sub-cell associated with antenna node 204-2. Once a new anchor antenna node has been switched into use, processing may loop back to step 410, as indicated by path 420.

Figure 5:
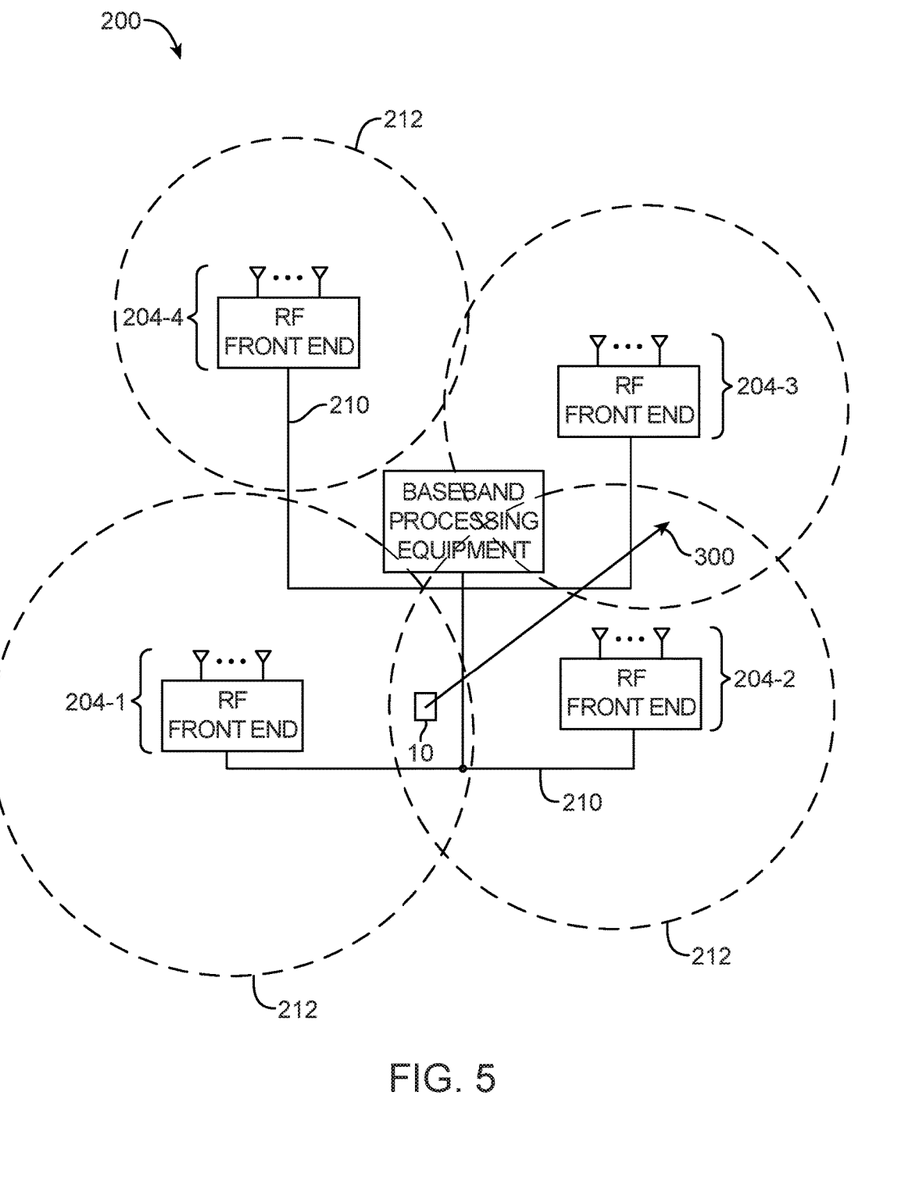
FIG. 5 is a diagram of an illustrative coordinated multipoint (CoMP) transmission radio communications network in which a user device is served by at least two of the multiple antenna nodes within a cell in accordance with an embodiment of the present invention.

In another suitable arrangement of the present invention, device 10 may be served by more than one antenna node. FIG. 5 is a diagram that illustrates multi-antenna node intra-cell mobility (e.g., device 10 may move within a given cell 200 and can be served by more than one antenna node at any point in time). In the example of FIG. 5, user device 10 may initially be served using antenna nodes 204-1 and 204-2. Radio-frequency signals that are transmitted through active serving antenna nodes 204-1 and 204-2 may be coordinated using baseband processing unit 202. In a scenario in which device 10 moves in direction 300, device 10 may detect that it is receiving stronger signals from antenna node 204-3 relative to antenna node 204-1. Device 10 may then report such findings to current serving baseband processing unit 202. In response to receiving this result, baseband processing unit 202 may switch antenna node 204-1 out of use and may switch antenna node 240-3 into use as a new serving antenna node while antenna node 204-2 remains active. As with single antenna node switching operations, performing antenna node switching among multiple antenna nodes that are part of the same cell 200 need not require any layer 2 or layer 3 handover protocols.

Figure 6:
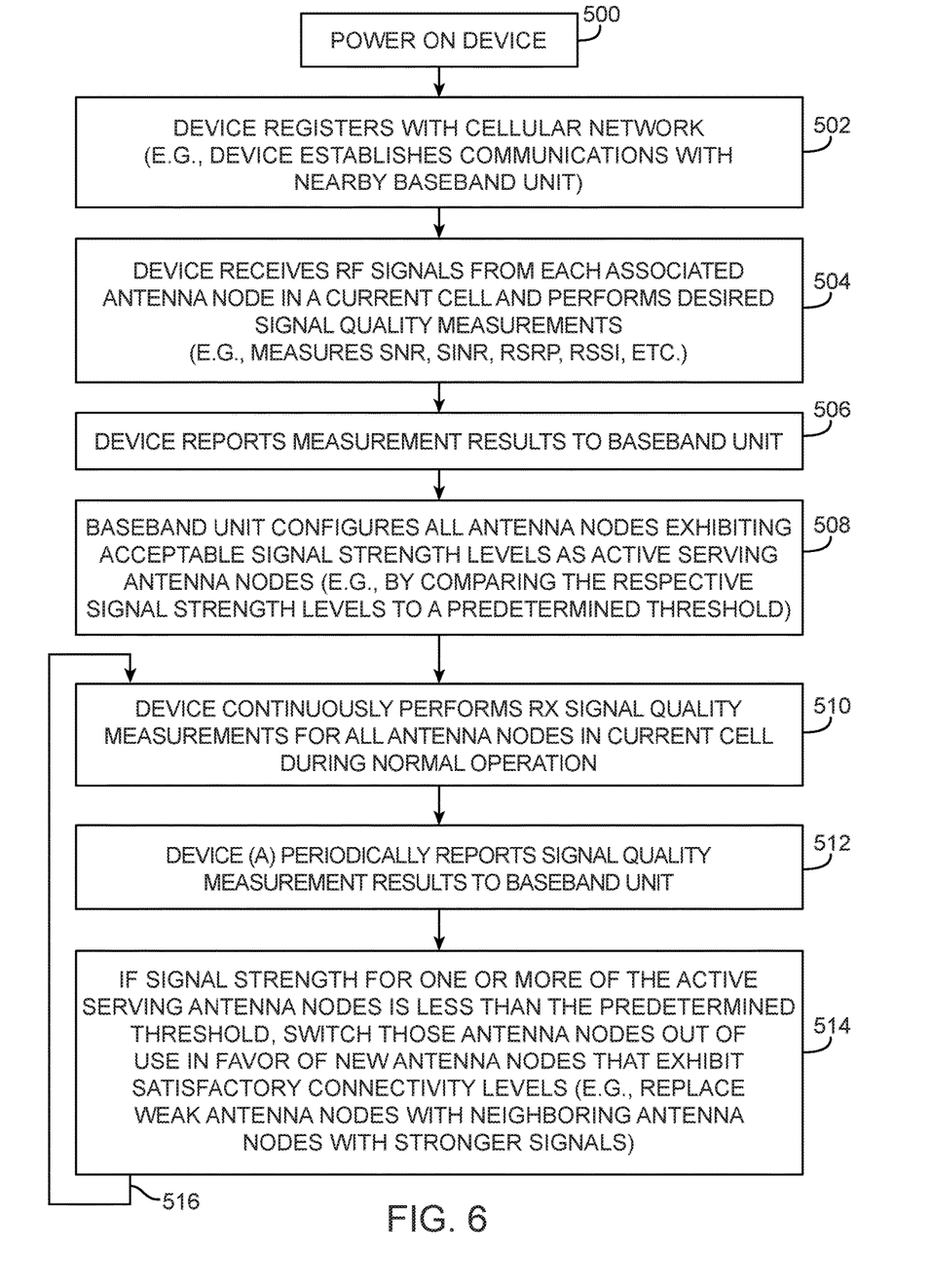
FIG. 6 is a flow chart of illustrative steps involved in operating the user device of FIG. 5 in accordance with an embodiment of the present invention.

FIG. 6 shows illustrative steps involved in operating user device 10 in a multiple antenna node intra-cell mobility scenario described in connection with FIG. 5. At step 500, device 10 may be powered on. At step 502, device 10 may register with the radio network (e.g., device 10 may establish a communications link with a nearby base station). That station becomes the current serving base station.

At step 504, device 10 may receive radio-frequency signals from at least some of antenna nodes associated with the serving base station and may be configured to perform desired signal quality measurements (e.g., device 10 may be configured to gather signal received power (RSRP) measurements, receive strength indicator (RSSI) measurements, received signal code power (RSCP) measurements, signal-to-interference ratio (SINR) information, signal-to-noise ratio (SNR) information, bit error rate measurements, etc.).

At step 506, device 10 may report the measurement results obtained during step 504 to base station 202. At step 508, base station 202 may configure antenna nodes exhibiting acceptable signal strength levels as active serving antenna nodes (e.g., antenna nodes having signal strength levels exceeding a predetermined threshold may be selected as active serving antenna nodes). At least one, at least two, or at least three antenna nodes may be selected as active serving antenna nodes during step 508 (as examples). Exemplary steps 502, 504, 506, and 508 describe procedures that can be used to help identify an initial group of active serving antenna nodes following device startup. Once the initial group of active serving antenna node has been determined, processing may proceed to step 510.

During normal operation, device 10 may continuously perform receive signal quality measurements for all detectable antenna nodes in the serving cell (step 510). At step 512, device 10 may periodically or aperiodically report the signal quality measurements to base station 202 via the current active serving antenna nodes. If the signal strength level for one or more of the active serving antenna nodes falls below the predetermined threshold, base station 202 may switch those antennas out of use in favor of previously inactive antenna nodes (i.e., antenna nodes that were previously switched out of use) that now exhibit satisfactory signal threshold levels. In other words, current serving antenna nodes that provide unacceptably weak signal levels may be replaced with new neighboring antenna nodes that provide signal levels meeting performance criteria (step 514). Processing may loop back to step 510 to continue monitoring receive signal strength levels during normal device operation, as indicated by path 516.

Figure 7:
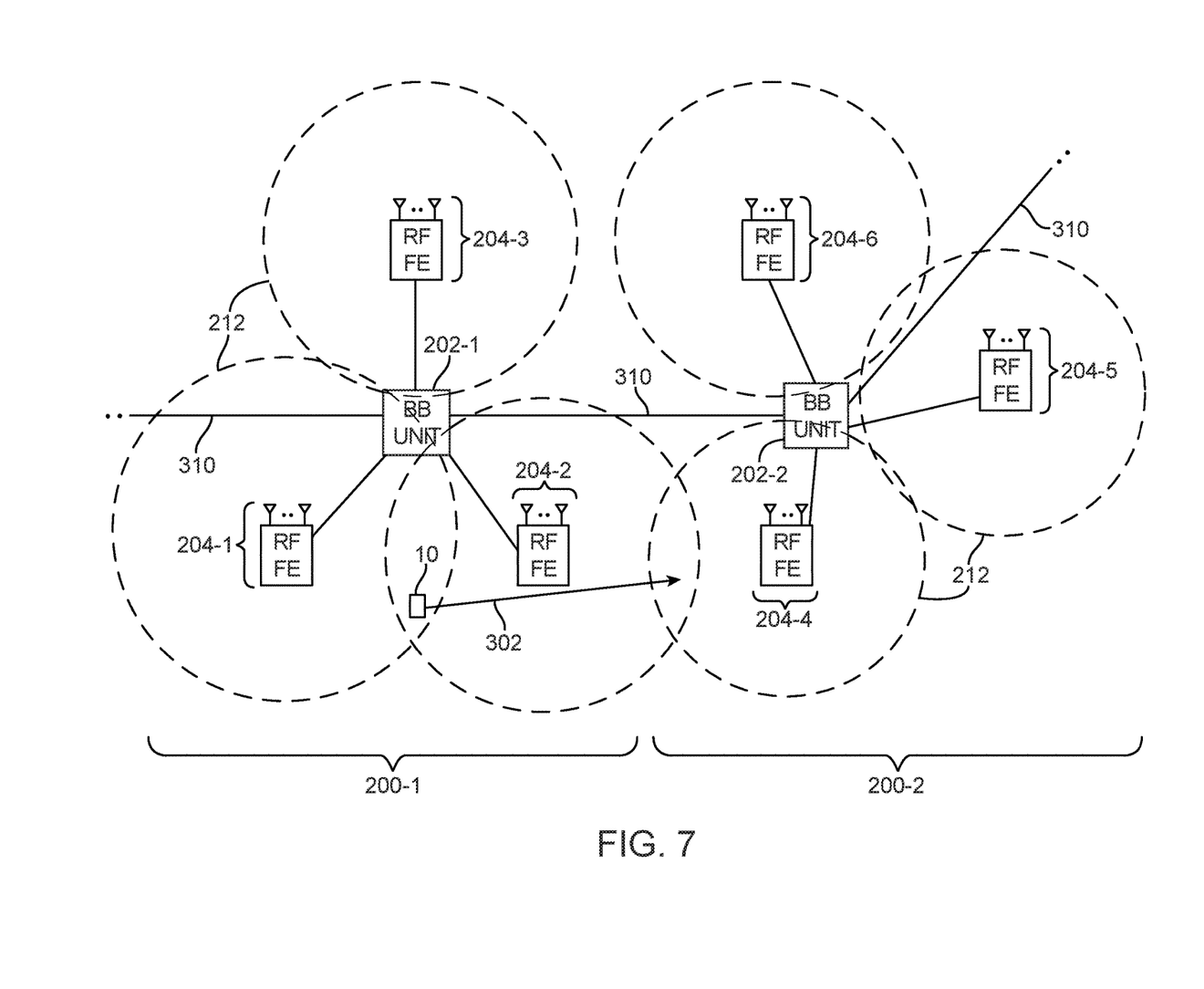
FIG. 7 is a diagram of an illustrative coordinated multipoint (CoMP) transmission radio communications network in which a user device can be simultaneously served by antenna nodes associated with more than one cell in accordance with an embodiment of the present invention.

In another suitable arrangement of the present invention, device 10 may be simultaneously served by antenna nodes belonging to adjacent cells (e.g., device 10 may be served using antenna nodes that are coupled to more than one baseband processing unit). FIG. 7 is a diagram that illustrates multi-antenna node inter-cell mobility (e.g., device 10 moving from one cell to another and can be served in parallel by antenna nodes associated with different cells at some point in time). In the example of FIG. 7, user device 10 may initially be served using coordinated antenna nodes 204-1 and 204-2 that are part of first cell 200-1 (e.g., antenna nodes 204-1 and 204-2 may be coupled to a first baseband processing unit 202-1 that handles all scheduling functions for cell 200-1). In the scenario in which device 10 moves in direction 302, device 10 may detect that it is receiving stronger signals from antenna node 204-4 that is part of a neighboring cell 200-2 (e.g., antenna node 204-4 may be coupled to a second baseband processing unit 200-2 that handles all scheduling functions for cell 200-2). Device 10 may then report such findings to baseband processing unit 202. In response to receiving the reported result, baseband processing unit 202 may switch antenna node 204-1 out of use and may switch antenna node 240-4 into use as a new serving antenna node while antenna node 204-2 remains active (so that device 10 is now being served by antenna node 204-2 belonging to cell 200-1 and antenna node 204-4 belonging to cell 200-2). In other words, it is possible for device 10 to be served by antenna nodes that are part of two or more neighboring cells in a CoMP radio network.

Unlike previously described inter-cell mobility scenarios, performing antenna node switching between adjacent cells may require at least layer 2 or higher layer handover protocols in the Open System Interconnection (OSI) stack. As shown in FIG. 7, adjacent cells 200-1 and 200-2 may be interconnected via interface 310. Information related to device 10 such as identification data associated with device 10, data to be transmitted to device 10, data received from device 10 (including the measured results obtained using device 10), scheduling information, and channel/precoding matrix information may be shared among at least two cells in a coordinated multipoint transmission radio communications network via such types of inter-cell interface (e.g., inter-cell interface 310).

Figure 8:
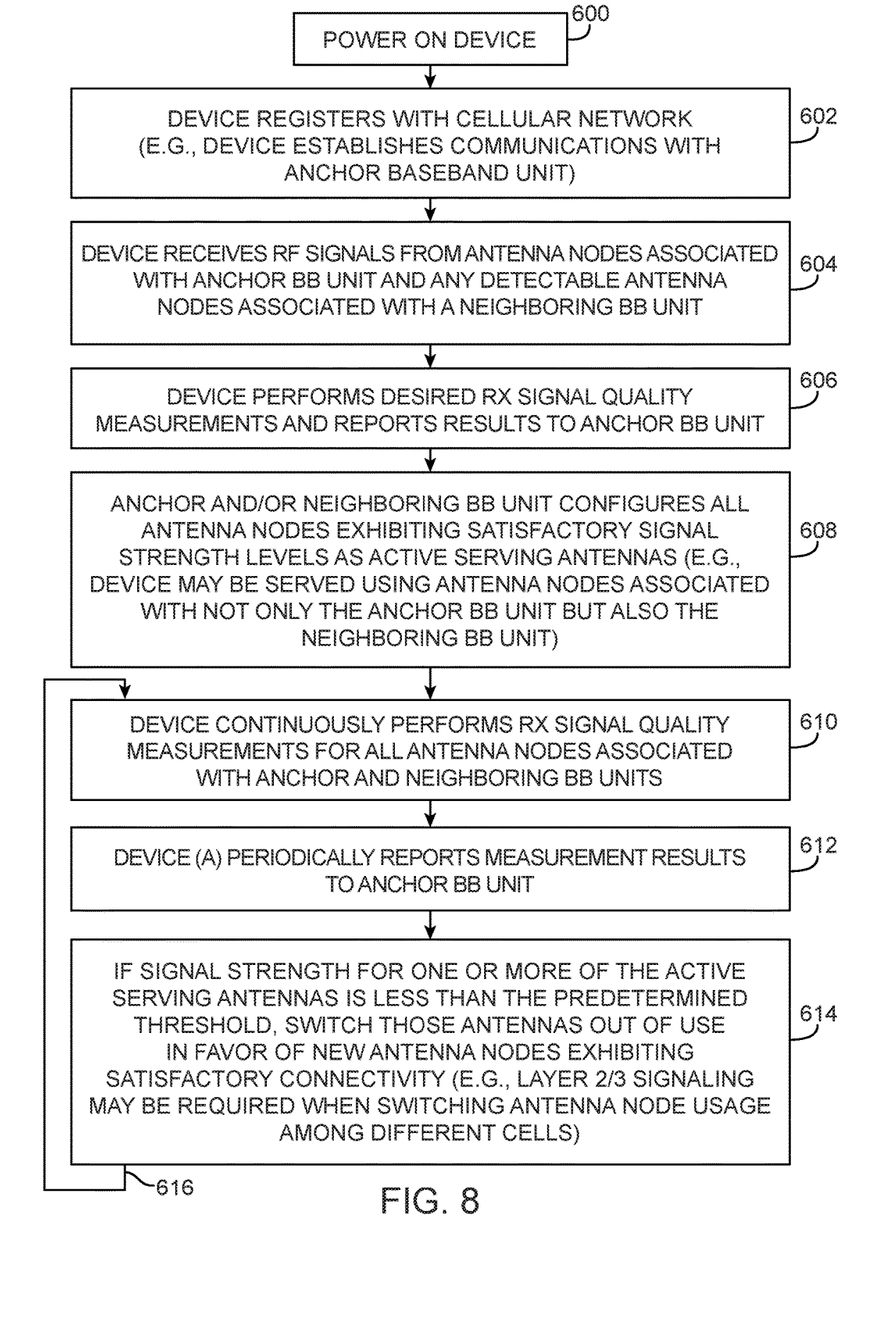
FIG. 8 is a flow chart of illustrative steps involved in operating the user device of FIG. 7 in accordance with an embodiment of the present invention.

FIG. 8 shows illustrative steps involved in operating user device 10 in a multiple antenna node inter-cell mobility scenario described in connection with FIG. 7. At step 600, device 10 may be powered on. At step 602, device 10 may register with a radio network (e.g., device 10 may establish a communications link with a nearby base station). That base station may currently serve as an anchor base station.

At step 604, device 10 may receive radio-frequency signals from at least some of antenna nodes associated with the anchor base station and may be configured to perform desired signal quality measurements on the received radio-frequency signals (e.g., device 10 may be configured to gather signal received power (RSRP) measurements, receive strength indicator (RSSI) measurements, received signal code power (RSCP) measurements, signal-to-interference ratio (SINR) information, signal-to-noise ratio (SNR) information, bit error rate measurements, etc.).

At step 606, device 10 may report the measurement results obtained during step 604 to the anchor base station. At step 608, base station 202 may configure antenna nodes exhibiting acceptable signal strength levels as active serving antenna nodes (e.g., antenna nodes having signal strength levels exceeding a predetermined threshold may be selected as active serving antenna nodes). Exemplary steps 602, 604, 606, and 608 describe procedures that can be used to help identify an initial group of active serving antenna nodes associated with an anchor base station following device startup. Once the initial group of active serving antenna node has been determined, processing may proceed to step 610.

During normal operation, device 10 may continuously perform receive signal quality measurements for all detectable antenna nodes in its vicinity (step 610). These antenna nodes may include antenna nodes that may or may not be coupled to the current anchor base station. At step 612, device 10 may periodically or aperiodically report the obtained signal quality measurements to the anchor base station. If the signal strength level for one or more of the active serving antenna nodes falls below the predetermined threshold, the anchor base station may switch those antennas out of use in favor of other antenna nodes that exhibit satisfactory signal strength levels (e.g., current serving antenna nodes that provide unacceptably weak signal levels may be replaced with new antenna nodes that could be part of neighboring cells and that provide signal levels meeting performance criteria) (step 614).

To switch antenna nodes that are part of neighboring cells in use, the anchor base station may send appropriate control signals to the base station of the neighboring cell (to direct the neighboring base station to switch the appropriate antenna node(s) into use). If the anchor base station no longer contains any active serving antenna nodes, a neighboring base station that contains a majority of the active serving antenna nodes may serve as the anchor base station. Processing may loop back to step 610 to continue monitoring receive signal levels during normal device operation, as indicated by path 616.

Figure 9:
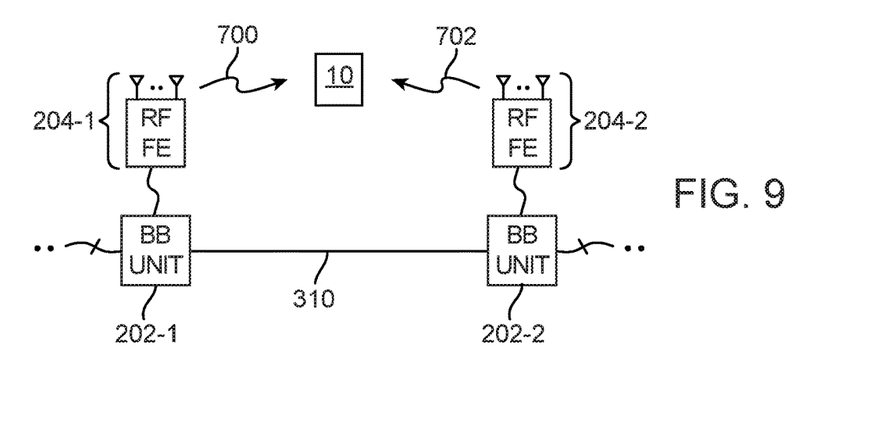
FIG. 9 is a diagram illustrating a coherent joint downlink transmission scheme in accordance with an embodiment of the present invention.

The different base stations in a coordinated multipoint transmission radio communications network may share information depending on the type of coordinated multipoint scheme. FIG. 9 illustrates a coherent joint downlink combining scheme in which multiple antenna nodes (that are part of one or more cells) transmit identical information to a user device 10. As shown in FIG. 9, antenna node 204-1 may be coupled to a first base station 202-1, whereas antenna node 204-2 may be coupled to a second base station 202-2. Assume in this scenario that device 10 is currently being served using antenna nodes 204-1 and 204-2. In the coherent joint combining scheme (sometimes referred to as a joint transmission scheme or dynamic cell selection scheme), the involved base stations 202-1 and 202-2 may share user data, scheduling information, and global channel/precoding matrix information and may be configured to transmit identical versions of downlink information using antenna nodes 204-1 and 204-2 (e.g., downlink information radiated over wireless path 700 and 702 may be identical). Device 10 may coherently combine amplitude and phase information received from the different coordinated transmission points (e.g., device 10 may coherently combined radio-frequency signals radiated from antenna nodes 204-1 and 204-2). This type of joint transmission may help improved signal-to-noise ratio and transmission latency but may require more complex network infrastructure.

Figure 10:
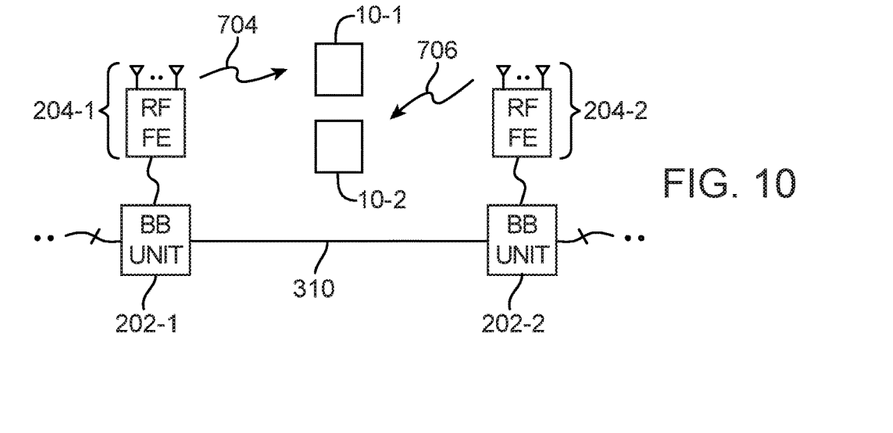
FIG. 10 is a diagram illustrating a non-coherent joint downlink transmission scheme in accordance with an embodiment of the present invention.

FIG. 10 illustrates a non-coherent joint downlink transmission (sometimes referred to as coordinated scheduling/beam-forming) scheme in which different antenna nodes belonging to different cells are configured to transmit information to respective user devices 10. In the example of FIG. 10, antenna node 204-1 that is coupled to first base station 202-1 may be used to radiate first radio-frequency signals to first device 10-1 via path 704, whereas antenna node 204-2 may be used to radiate second radio-frequency signals to second device 10-2 via path 706. In the non-coherent coordinated scheduling/beam-forming (CS/CB) scheme, the involved base stations may be configured to share scheduling information and limited precoding matrix information. This type of coordinated transmission can help provide minimal interference among multiple user devices 10 and may require less complex infrastructure compared to the coherent joint transmission scheme (at the cost of reduced signal-to-noise ratio).

Figure 11:
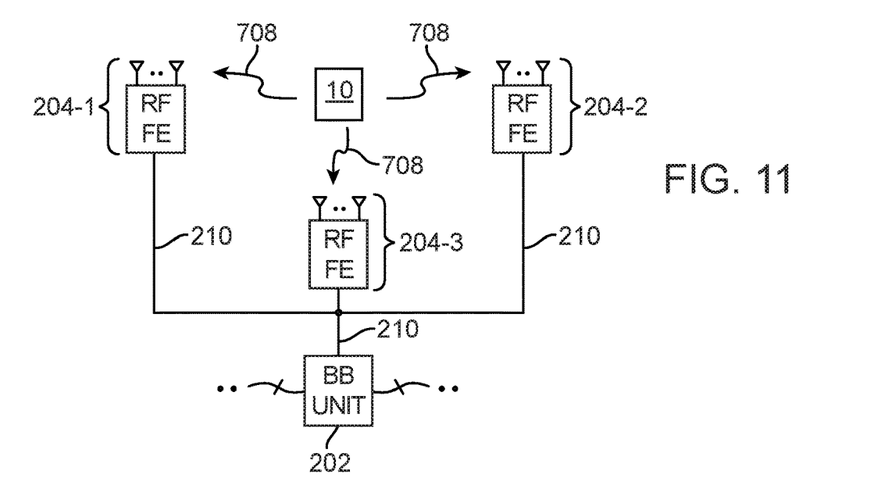
FIG. 11 is a diagram illustrating a coherent joint uplink transmission scheme in accordance with an embodiment of the present invention.

FIG. 11 illustrates a coherent joint uplink transmission scheme (sometimes referred to as a coordinated multipoint reception scheme) in which different antenna nodes that are acting as current active antenna nodes receive uplink signals from user device 10 and forwards the received signals to an anchor base station. In the example of FIG. 11, antenna nodes 204-1, 204-2, and 204-3 may receive uplink radio-frequency signals from device 10 over wireless paths 708. Antenna nodes 204-1, 204-2, and 204-3 may forward the received uplink signals to corresponding anchor base station 202 via path 210. The example of FIG. 11 is merely illustrative and does not serve to limit the scope of the present invention. In other suitable scenarios, antenna nodes belong to different cells may simultaneously receive uplink signals from device 10 and may be configured to forward that received uplink signals to a corresponding anchor base station (via inter-cell interface paths as described in connection with FIG. 7).

The foregoing is merely illustrative of the principles of this invention and various modifications can be made by those skilled in the art without departing from the scope and spirit of the invention. The foregoing embodiments may be implemented individually or in any combination.

What is claimed is:

1. A base station apparatus, comprising:
one or more processing elements; and
one or more non-transitory memories having program instructions stored thereon that are executable by the one or more processing elements to:
configure a mobile device to report signal quality measurements based on signals received from at least a portion of a first plurality of antenna nodes coupled to the base station, wherein at least two of the first plurality of antenna nodes are geographically separated;
transmit information to a second base station, during an interval in which the mobile device is configured to receive signals from at least a portion of a second plurality of antenna nodes coupled to the second base station, wherein at least two of the second plurality of antenna nodes are geographically separated, wherein the information is for use by the second base station to determine whether to handover between cells corresponding to different ones of the second plurality of antenna nodes to change a primary cell for uplink transmissions from the mobile device, and wherein the information comprises:
information identifying the mobile device; and
at least one signal quality measurement received from the mobile device via at least one of the first plurality of antenna nodes, wherein the at least one signal quality measurement includes reference signal received power (RSRP).

2. The base station apparatus of claim 1, wherein the information further comprises scheduling information for the mobile device.

3. The base station apparatus of claim 1, wherein, to configure the mobile device to report signal quality measurements, the base station apparatus is configured to select one of the first plurality of antenna nodes as a first target node to receive uplink signals from the mobile device.

4. The base station apparatus of claim 3, wherein the base station apparatus is configured to, subsequent to selection of the first target node, to select a different one of the first plurality of antenna nodes as a second target node to receive uplink signals from the mobile device.

5. The base station apparatus of claim 3, wherein selection of the first target node is based on determined signal strength of communications between the first target node and the mobile device.

6. The base station apparatus of claim 1, wherein the signal quality measurements further include at least one of: received signal strength indicator (RSSI) information, received signal code power (RSCP) information, signal-to-interference ratio (SINR) information, signal-to-noise ratio (SNR) information, or bit error rate information.

7. The base station apparatus of claim 1, wherein, based on signal quality measurements, the base station is configured to configure the mobile device to receive signals via a different portion of the first plurality of antenna nodes coupled to the base station and via a different portion of second plurality of antenna nodes coupled to the second base station.

8. A method, comprising:
configuring, by a base station, a mobile device to report signal quality measurements based on signals received from at least a portion of a first plurality of antenna nodes coupled to the base station, wherein at least two of the first plurality of antenna nodes are geographically separated;
transmitting, by the base station, information to a second base station, during an interval in which the mobile device is configured to receive signals from at least a portion of a second plurality of antenna nodes coupled to the second base station, wherein at least two of the second plurality of antenna nodes are geographically separated, wherein the information is for use by the second base station to determine whether to handover between cells corresponding to different ones of the second plurality of antenna nodes to change a primary cell for uplink transmissions from the mobile device, and wherein the information comprises:
information identifying the mobile device; and
at least one signal quality measurements received from the mobile device via at least one of the first plurality of antenna nodes, wherein the at least one signal quality measurement includes reference signal received power (RSRP).

9. The method of claim 8, further comprising:
the second base station modifying the portion of the second plurality of antenna nodes that are used to communicate with the mobile device, based on the received signal quality measurements.

10. The method of claim 8, wherein the information further comprises scheduling information for the mobile device.

11. The method of claim 8, further comprising:
the base station configuring the mobile device to report signal quality measurements to a selected one of the first plurality of antenna nodes as a first target node to receive uplink signals from the mobile device.

12. The method of claim 11, further comprising selecting a different one of the first plurality of antenna nodes as a second target node to receive uplink signals from the mobile device, based on signal quality measurements, subsequent to use of the first target node to receive uplink signals from the mobile device.

13. The method of claim 8, wherein the signal quality measurements further include at least one of: received signal strength indicator (RSSI) information, received signal code power (RSCP) information, signal-to-interference ratio (SINR) information, signal-to-noise ratio (SNR) information, or bit error rate information.

14. The method of claim 8, further comprising:
the base station modifying the portion of antenna nodes used to communicate with the mobile device based on the signal quality measurements.

15. An apparatus, comprising:
one or more processing elements; and
one or more non-transitory memories having program instructions stored thereon that are executable to:
report signal quality measurements to a first base station based on signals received from at least a portion of a first plurality of antenna nodes coupled to a first base station, wherein at least two of the first plurality of antenna nodes are geographically separated;
communicate with a second base station using at least a portion of a second plurality of antenna nodes coupled to the second base station, wherein at least two of the second plurality of antenna nodes are geographically separated and;
wherein the first base station is configured to send, to the second base station, information that specifies: an identification of apparatus and at least one signal quality measurement received from the apparatus via at least one of the first plurality of antenna nodes, wherein the at least one signal quality measurement includes reference signal received power (RSRP); and
wherein subsequent communications of the apparatus with the second base station are configured based on a handover between cells corresponding to different ones of the second plurality of antenna nodes to change a primary cell for uplink transmissions from the apparatus, wherein the handover is performed based on the information.

16. The apparatus of claim 15, wherein the information further comprises scheduling information for the apparatus.

17. The apparatus of claim 15, wherein the apparatus is configured to:
switch from reporting signal quality measurements to a first base station via a first one of the first plurality of antenna nodes to a second one of the first plurality of antenna nodes based on configuration information received from the base station, wherein the configuration information is generated based on previously reported signal quality measurements from the apparatus.

18. The apparatus of claim 15, wherein the apparatus is a mobile device that further comprises:
one or more radios; and
one or more antennas coupled to the one or more radios for wireless communications.

19. The apparatus of claim 15, wherein the apparatus is configured to communicate via a different portion of the second plurality of antenna nodes based on configuration information from the second base station.

* * * * *